US011885740B2

(12) United States Patent
Barenthin-Syberg et al.

(10) Patent No.: US 11,885,740 B2
(45) Date of Patent: Jan. 30, 2024

(54) DETERMINATION OF LEVEL AND SPAN FOR GAS DETECTION SYSTEMS AND METHODS

(71) Applicant: FLIR Systems AB, Täby (SE)

(72) Inventors: Marta Barenthin-Syberg, Stockholm (SE); Hakan E. Nygren, Upplands Väsby (SE); Tien Nguyen, Täby (SE)

(73) Assignee: FLIR Systems AB, Täby (SE)

( * ) Notice: Subject to any disclaimer, the term of this patent is extended or adjusted under 35 U.S.C. 154(b) by 370 days.

(21) Appl. No.: 17/351,148

(22) Filed: Jun. 17, 2021

(65) Prior Publication Data
US 2021/0310940 A1 Oct. 7, 2021

Related U.S. Application Data

(63) Continuation of application No. PCT/US2019/063773, filed on Nov. 27, 2019.
(Continued)

(51) Int. Cl.
*G01N 21/3504* (2014.01)
*G06T 5/40* (2006.01)
(Continued)

(52) U.S. Cl.
CPC .......... *G01N 21/3504* (2013.01); *G06T 5/40* (2013.01); *H04N 5/33* (2013.01); *H04N 25/75* (2023.01); *G06T 2207/10048* (2013.01)

(58) Field of Classification Search
CPC ....... G01N 21/3504; G06T 5/008; G06T 5/40; G06T 2207/10048; G06T 2207/20012;
(Continued)

(56) References Cited

FOREIGN PATENT DOCUMENTS

CN 105973474 9/2016
EP 2942776 11/2015
(Continued)

OTHER PUBLICATIONS

Pratt, W.K. Ed—Pratt W.K.: "Digital Image Processing (Third Edition), Chapter 10 Image Enhancement", Jan. 1, 2001 (Jan. 1, 2001), Digital Image Processing: Piks Inside, New York: John Wiley & Sons, US, pp. 243-296, XP002407529, ISBN: 978-0-471-37407-7 section 10.1.2; figures 10.1-5.

*Primary Examiner* — Mark R Gaworecki
(74) *Attorney, Agent, or Firm* — Haynes and Boone, LLP

(57) ABSTRACT

Various techniques are provided for increasing contrast between gas features and other features in a scene. In one example, a method includes receiving a captured image frame comprising a plurality of pixels having a first range of associated pixel values. The method also includes receiving a selection of a subset of the pixels, wherein the subset comprises a gas feature and a scene feature. The method also includes determining a span associated with the pixels of the subset having a second range of associated pixel values smaller than the first range. The method also includes scaling the captured image frame to provide an adjusted image frame limited to the second range of pixel values associated with the span to increase contrast between the gas feature and the scene feature. The method also includes displaying the adjusted image frame. Additional methods and systems are also provided.

20 Claims, 5 Drawing Sheets

Related U.S. Application Data

(60) Provisional application No. 62/783,080, filed on Dec. 20, 2018.

(51) Int. Cl.
*H04N 5/33* (2023.01)
*H04N 25/75* (2023.01)

(58) Field of Classification Search
CPC . G06T 2207/20104; H04N 5/33; H04N 25/75
See application file for complete search history.

(56) References Cited

FOREIGN PATENT DOCUMENTS

| WO | WO 2013/070132 | 5/2013 | | |
|----|----------------|--------|---|---|
| WO | WO-2018183973 A1 | * | 10/2018 | ......... G01N 21/3504 |

* cited by examiner

DETERMINATION OF LEVEL AND SPAN FOR GAS DETECTION SYSTEMS AND METHODS

CROSS-REFERENCE TO RELATED APPLICATIONS

This application is a continuation of International Patent Application No. PCT/US2019/063773 filed Nov. 27, 2019 and entitled "DETERMINATION OF LEVEL AND SPAN FOR GAS DETECTION SYSTEMS AND METHODS," which are all hereby incorporated by reference in its entirety.

International Patent Application No. PCT/US2019/063773 claims priority to and benefit of U.S. Provisional Patent Application No. 62/783,080 filed Dec. 20, 2018 and entitled "DETERMINATION OF LEVEL AND SPAN FOR GAS DETECTION SYSTEMS AND METHODS," which is hereby incorporated by reference in its entirety.

TECHNICAL FIELD

The present invention relates generally to gas detection techniques and, more particularly, to the display of gas images.

BACKGROUND

In the field of gas detection, infrared imaging systems such as gas detection cameras are used to capture image frames (e.g., images) of a scene where a gas of interest is present. The captured image frames include a plurality of pixels, each of which has an associated pixel value.

Because the captured infrared image frames may include features that exhibit significantly different infrared radiation intensities (e.g., gas plumes versus other features), the pixel values of the captured image frames can vary greatly. This complicates the ability to effectively display gas image frames to a user, for example, on a screen of a gas detection camera.

In this regard, conventional gas detection cameras typically require a user to select the range of pixel values to be displayed. Unfortunately, such systems generally consider the entirety of the image for purposes of selecting the range of pixel values. This can be problematic when the particular pixel values associated with a gas of interest are clustered around a small range of pixel values that may be close to pixel values associated with other features. In such cases, the gas of interest may be difficult to view in the captured image frames and may not exhibit sufficient contrast from other features to be easily discernable by the user. As a result, it is difficult and time consuming for users of such conventional systems to manually adjust conventional systems to increase the gas contrast.

SUMMARY

Improved techniques for displaying gas images with improved contrast are provided. For example, the level and span used for displaying gas images may be selected using a subset of a captured image frame. In some embodiments, a histogram of pixel values associated with the subset may be generated and analyzed to determine the level and span.

In one embodiment, a method includes receiving a captured image frame comprising a plurality of pixels having a first range of associated pixel values; receiving a selection of a subset of the pixels, wherein the subset comprises a gas feature and a scene feature; determining a span associated with the pixels of the subset having a second range of associated pixel values smaller than the first range; scaling the captured image frame to provide an adjusted image frame limited to the second range of pixel values associated with the span to increase contrast between the gas feature and the scene feature; and displaying the adjusted image frame.

In another embodiment, a system includes an imager configured to capture image frames; a display; and a logic device configured to: receive a captured image frame comprising a plurality of pixels having a first range of associated pixel values, receive a selection of a subset of the pixels, wherein the subset comprises a gas feature and a scene feature, determine a span associated with the pixels of the subset having a second range of associated pixel values smaller than the first range, scale the captured image frame to provide an adjusted image frame limited to the second range of pixel values associated with the span to increase contrast between the gas feature and the scene feature, and provide the adjusted image frame to the display.

In another embodiment, a method includes receiving a first captured image frame comprising a plurality of pixels having a first range of associated pixel values; receiving a selection of a subset of the pixels, wherein the subset comprises a scene feature; determining a span associated with the pixels of the subset having a second range of associated pixel values smaller than the first range; wherein the span comprises a first limit associated with the scene feature and a second limit associated with an expected gas feature; receiving a second captured image frame comprising the scene feature and the gas feature; and scaling the second captured image frame to provide an adjusted image frame limited to the second range of pixel values associated with the span to increase contrast between the gas feature and the scene feature.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
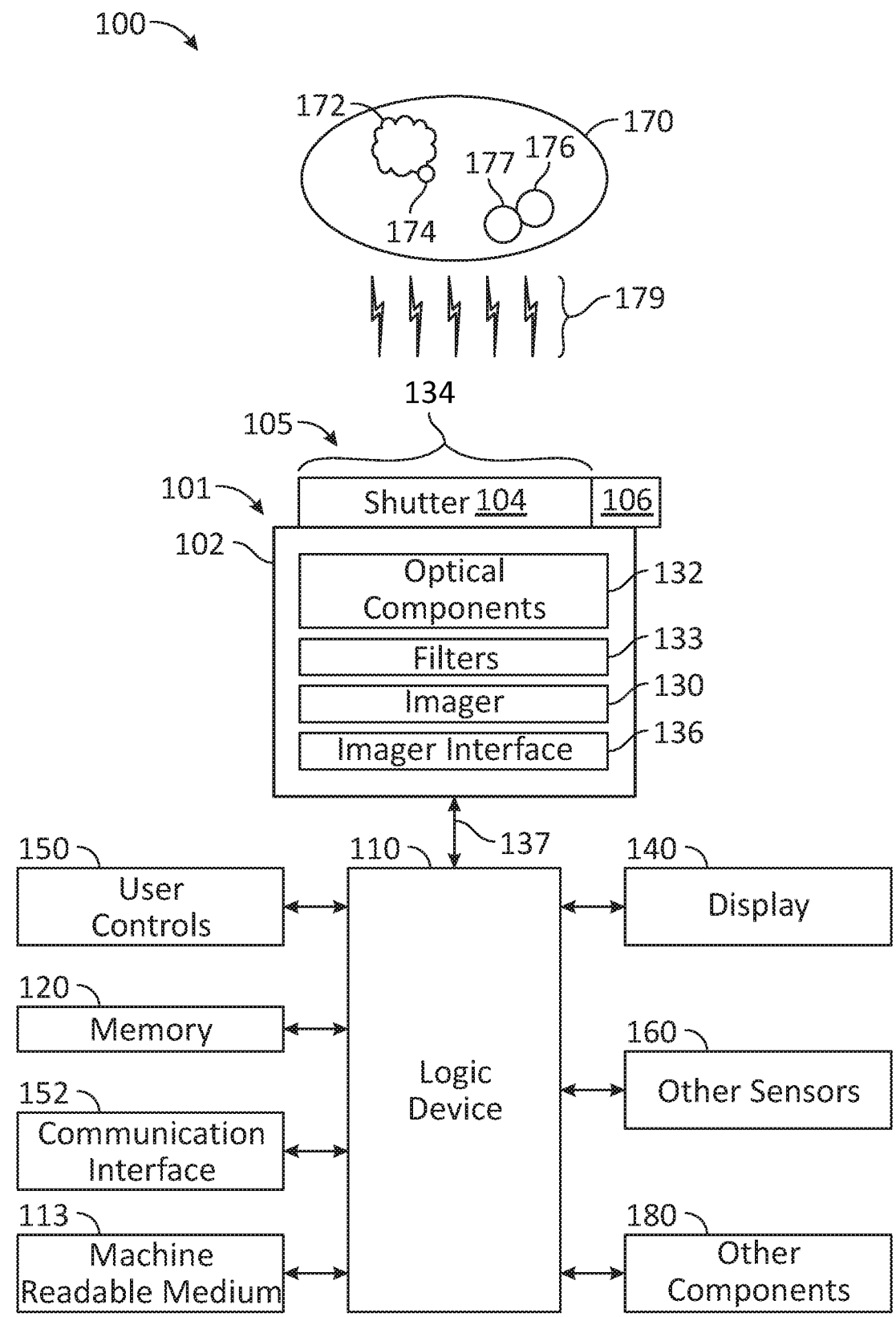
FIG. 1 illustrates a block diagram of an imaging system in accordance with an embodiment of the disclosure.

Various techniques are provided to select the level and span of pixel values displayed for captured image frames in a manner that improves contrast between gas features and non-gas features of the displayed image frames. For example, the level and span of displayed pixel values may be selected based on an analysis of pixel values in a subset of a captured image frame that includes a gas of interest. By selecting the level and span using pixel values of the subset that includes the gas, other portions of the image frame having significantly higher or significantly lower pixel values may be outside the range of the selected level and span. The pixel values displayed to the user may be scaled over the selected span, thus improving contrast between the gas and other features of the image frame.

For example, various gases of interest may exhibit particular absorption characteristics such that certain infrared wavelengths are absorbed by the gas while others are transmitted (e.g., absorption and transmission of infrared radiation varies by wavelength). By filtering infrared radiation received by an imaging system to particular wavelength ranges (e.g., wavebands), gas can be detected through appropriate processing of the infrared image frames.

Although an imaging system may be configured to image a gas over a specified wavelength range, other features of the imaged scene (e.g., also referred to as background features or scene features) may also exhibit infrared radiation in the specified wavelength range and therefore will also be present in the captured image frames. Accordingly, the captured image frames may receive infrared radiation in the specified wavelength range from the gas to be detected in the imaged scene as well as other features of the imaged scene at different intensities. For example, a gas in the scene that exhibits substantial absorption in the filtered waveband may exhibit lower intensity than another feature having a higher intensity.

However, substantial differences in intensity can present problems when captured image frames are displayed to a user in conventional systems. For example, in conventional systems, a user may be required to specify a level (e.g., a reference pixel value) and a span (e.g., a range of pixel values greater than and less than the reference pixel value) to be displayed in a captured image frame. Unfortunately, if the span encompasses a wide range of pixel values (e.g., all pixel values present in the entire image frame), then it may be difficult for the user to actually discern the gas in the captured image frame. In this case, the range of pixel values associated with the gas may represent a small portion of the overall range of pixel values displayed in the image frame. As a result, the pixel values of the gas of interest may be scaled in a manner that is close to the pixel values of other features (e.g., the gas and other features may exhibit a similar number of pixel counts that are mapped to similar grayscale values or similar false color values when the image frames are displayed).

Such problems associated with conventional systems may be overcome by selecting the level and span in an automated manner using a selected subset of a captured image frame in accordance with various embodiments further discussed herein. For example, in some embodiments, a histogram-based analysis may be performed, and other techniques are also contemplated.

Turning now to the drawings, FIG. 1 illustrates a block diagram of an imaging system 100 in accordance with an embodiment of the disclosure. Imaging system 100 may include a camera 101, a logic device 110, a machine-readable medium 113, a memory 120, a display 140, user controls 150, a communication interface 152, other sensors 160, and other components 180.

Camera 101 may be used to capture and process image frames (e.g., images) of a scene 170 (e.g., a field of view). As shown, scene 170 may include a gas 172 (e.g., a gas plume) and various scene features 174, 176, and 178 all of which may contribute to infrared radiation 179 passed from scene 170 to camera 101. In various embodiments, camera 101 may be implemented as a visible image camera, an infrared camera (e.g., thermal camera), and/or other types of cameras as appropriate. As shown, camera 101 may include a housing 102, a shutter 104, an actuator 106, an imager 130, optical components 132, filters 133, and an image interface 136.

Optical components 132 (e.g., one or more lenses) receive infrared radiation 179 from scene 170 through an aperture 134 and pass infrared radiation 179 to imager 130. Filters 133 (e.g., one or more long pass, short pass, and/or band pass filters) operate to restrict infrared radiation 179 to limited wavelength ranges for imaging.

Imager 130 may include an array of sensors (e.g., any type of infrared, visible light, or other types of detectors) for capturing image frames of scene 170. In some embodiments, imager 130 may also include one or more analog-to-digital converters for converting analog signals captured by the sensors into digital data (e.g., pixel values) to provide the captured image frames. Image interface 136 provides the captured image frames to logic device 110 (e.g., over a connection 137) which may be used to process the image frames, store the original and/or processed image frames in memory 120, and/or retrieve stored image frames from memory 120.

Camera 101 also includes a shutter 104 that may be selectively positioned (e.g., through the operation of an actuator 106 under the control of logic device 110) in front of optical components 132 and/or imager 130 to block infrared radiation 179 from being received by imager 130. For example, actuator 106 may position to shutter 104 to block aperture 134 such that imager 130 may capture image frames of shutter 104 for calibration purposes. In this regard, in some embodiments, shutter 104 may provide a temperature controlled black body surface 105 facing imager 130 that is captured in one or more image frames by imager 130 to determine correction values for rows, columns, and/or individual pixels associated with the sensors of imager 130. Actuator 106 may also position shutter 104 to not block aperture 134 and thus permit imager 130 to capture image frames of infrared radiation 179 received from scene 170 when calibration is not taking place.

Logic device 110 may include, for example, a microprocessor, a single-core processor, a multi-core processor, a microcontroller, a programmable logic device configured to perform processing operations, a digital signal processing (DSP) device, one or more memories for storing executable instructions (e.g., software, firmware, or other instructions), and/or any other appropriate combinations of devices and/or memory to perform any of the various operations described herein. Logic device 110 is configured to interface and communicate with the various components illustrated in FIG. 1 to perform method and processing steps as described herein. In various embodiments, processing instructions may be integrated in software and/or hardware as part of logic device 110, or code (e.g., software and/or configuration data) which may be stored in memory 120 and/or a machine readable medium 113. In various embodiments, the instructions stored in memory 120 and/or machine-readable medium 113 permit logic device 110 to perform the various operations discussed herein and/or control various components of system 100 for such operations.

Memory 120 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, fixed memory, removable memory, and/or other types of memory.

Machine readable medium 113 (e.g., a memory, a hard drive, a compact disk, a digital video disk, or a flash memory) may be a non-transitory machine-readable medium storing instructions for execution by logic device 110. In various embodiments, machine readable medium 113 may be included as part of imaging system 100 and/or separate from imaging system 100, with stored instructions provided to imaging system 100 by coupling the machine readable medium 113 to imaging system 100 and/or by imaging system 100 downloading (e.g., via a wired or wireless link) the instructions from the machine readable medium (e.g., containing the non-transitory information).

Logic device 110 may be configured to process captured image frames and provide them to display 140 for viewing by a user. Display 140 may include a display device such as a liquid crystal display (LCD), an organic light-emitting diode (OLED) display, and/or other types of displays as appropriate to display image frames and/or information to a user of system 100. Logic device 110 may be configured to display image frames and information on display 140. For example, logic device 110 may be configured to retrieve image frames and information from memory 120 and provide image frames and information to display 140 for presentation to a user of system 100. Display 140 may include display electronics, which may be utilized by logic device 110 to display such image frames and information.

User controls 150 may include any desired type of user input and/or interface device having one or more user actuated components, such as one or more buttons, slide bars, knobs, keyboards, joysticks, and/or other types of controls that are configured to generate one or more user actuated input control signals. In some embodiments, user controls 150 may be integrated with display 140 as a touchscreen to operate as both user controls 150 and display 140. Logic device 110 may be configured to sense control input signals from user controls 150 and respond to sensed control input signals received therefrom. In some embodiments, portions of display 140 and/or user controls 150 may be implemented by appropriate portions of a tablet, a laptop computer, a desktop computer, and/or other types of devices.

In various embodiments, user controls 150 may be configured to include one or more other user-activated mechanisms to provide various other control operations of imaging system 100, such as auto-focus, menu enable and selection, field of view (FoV), brightness, contrast, gain, offset, spatial, temporal, and/or various other features and/or parameters.

Imaging system 100 may include various types of other sensors 160 including, for example, motion sensors (e.g., accelerometers, vibration sensors, gyroscopes and/or others), microphones, navigation sensors (e.g., global positioning system (GPS) sensors), and/or other sensors as appropriate.

Logic device 110 may be configured to receive and pass image frames from camera component 101, additional data from sensors 160, and control signal information from user controls 150 to one or more external devices through communication interface 152 (e.g., through wired and/or wireless communications). In this regard, communication interface 152 may be implemented to provide wired communication over a cable and/or wireless communication over an antenna. For example, communication interface 152 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components configured for communication with a network. As such, communication interface 152 may include an antenna coupled thereto for wireless communication purposes. In other embodiments, the communication interface 152 may be configured to interface with a DSL (e.g., Digital Subscriber Line) modem, a PSTN (Public Switched Telephone Network) modem, an Ethernet device, and/or various other types of wired and/or wireless network communication devices configured for communication with a network.

In some embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) configured to communicate with other communication networks, such as the Internet. As such, in various embodiments, imaging system 100 and/or its individual associated components may be associated with a particular network link such as for example a URL (Uniform Resource Locator), an IP (Internet Protocol) address, and/or a mobile phone number.

Imaging system 100 may include various other components 180 such as speakers, displays, visual indicators (e.g., recording indicators), vibration actuators, a battery or other power supply (e.g., rechargeable or otherwise), and/or additional components as appropriate for particular implementations.

In some embodiments, system 100 may be a gas detection camera. However, other embodiments are also contemplated. For example, although various features of imaging system 100 are illustrated together in FIG. 1, any of the various illustrated components and subcomponents may be implemented in a distributed manner and used remotely from each other as appropriate. For example, various subcomponents of camera 101 may be implemented separately and from each other in some embodiments.

Figure 2:
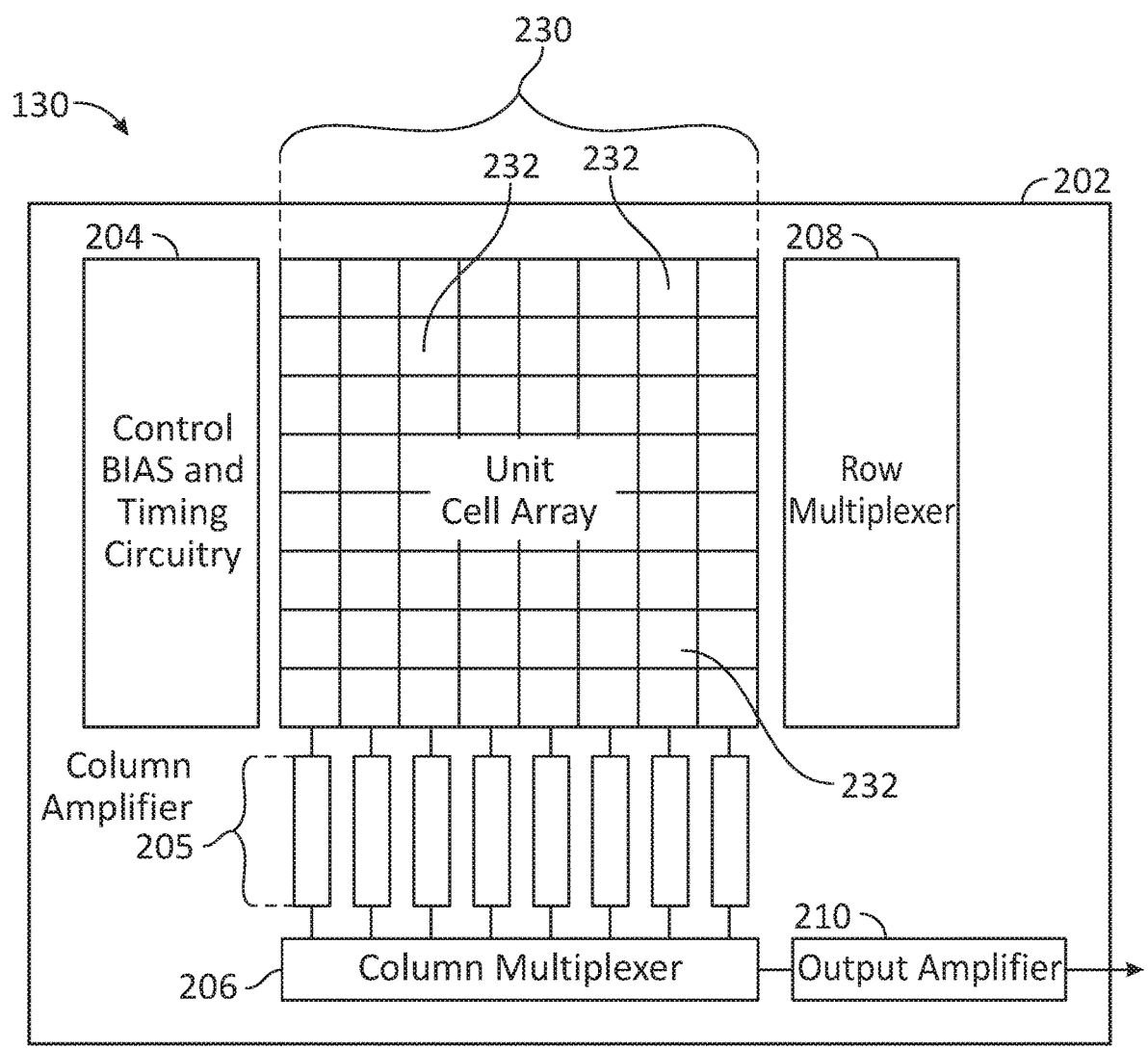
FIG. 2 illustrates a block diagram of an imager in accordance with an embodiment of the disclosure.

FIG. 2 illustrates a block diagram of imager 130 in accordance with an embodiment of the disclosure. In this illustrated embodiment, imager 130 is a focal plane array (FPA) including a sensor array 230 of infrared sensors 232 (e.g., implemented as unit cells) and a read out integrated circuit (ROIC) 202. Although an 8 by 8 array of infrared sensors 232 is shown, this is merely for purposes of example and ease of illustration. Any desired sensor array size may be used as desired.

Each infrared sensor 232 may be implemented, for example, by an infrared detector such as a microbolometer and associated circuitry to provide image data (e.g., a data value associated with a captured voltage) for a pixel of a captured thermal image. In this regard, time-multiplexed electrical signals may be provided by the infrared sensors 232 to ROIC 202.

ROIC 202 includes bias generation and timing control circuitry 204, column amplifiers 205, a column multiplexer 206, a row multiplexer 208, and an output amplifier 210. Image frames captured by infrared sensors 232 may be provided by output amplifier 210 to processing component 110 and/or any other appropriate components to perform various processing techniques described herein. Further descriptions of ROICs and infrared sensors (e.g., microbolometer circuits) may be found in U.S. Pat. No. 6,028,309 issued Feb. 22, 2000, which is incorporated herein by reference in its entirety.

Figure 3:
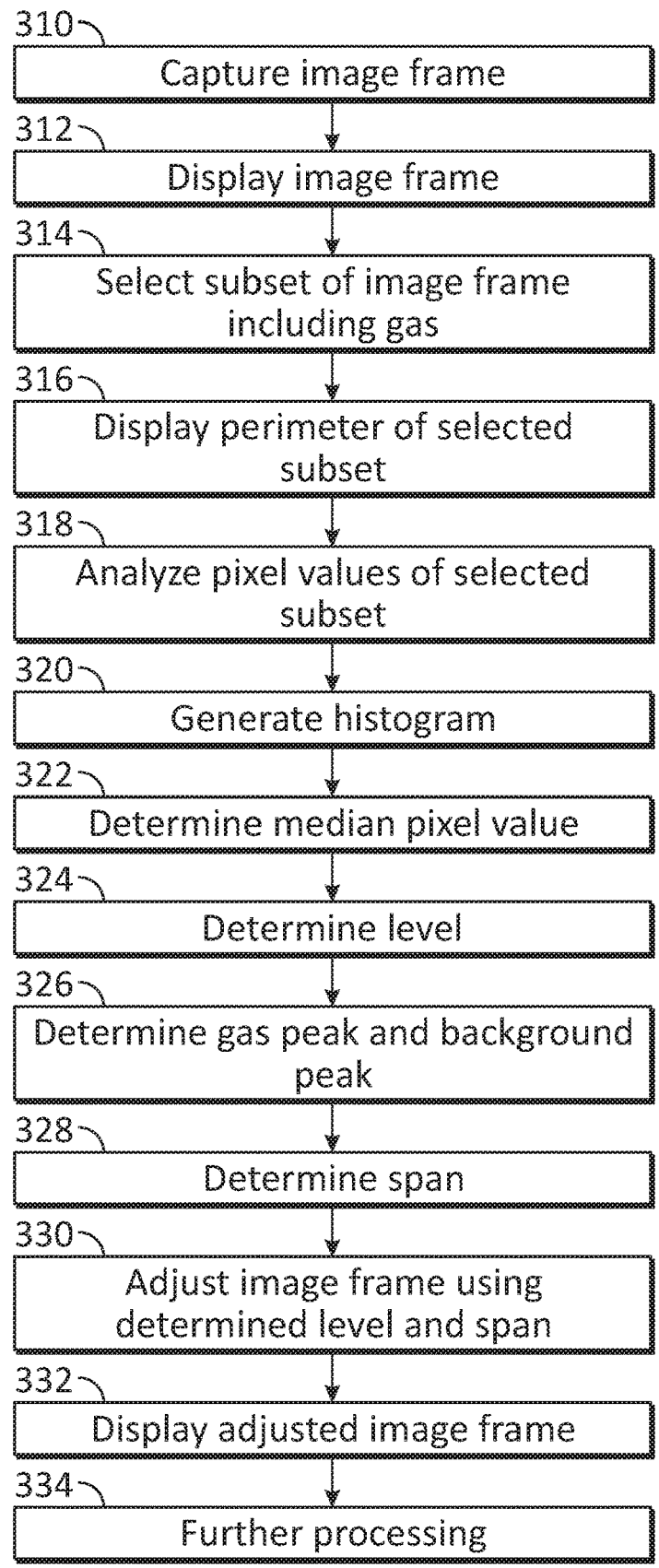
FIG. 3 illustrates a process of determining level and span settings for the display of captured image frames in accordance with an embodiment of the disclosure.

FIG. 3 illustrates a process of determining level and span settings for the display of captured image frames in accordance with an embodiment of the disclosure. In block 310, imager 130 captures an infrared image frame of scene 170. The image frame may be provided fall to logic device 110, for example, through imager interface 136 and connection 137 for processing.

Figure 4:
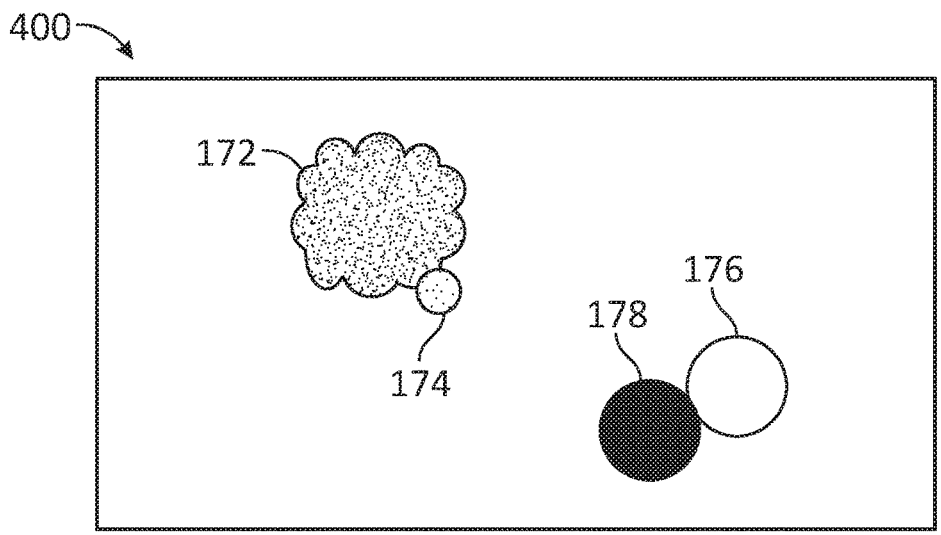
FIG. 4 illustrates a captured image frame in accordance with an embodiment of the disclosure.

In block 312, logic device 110 displays the captured image frame on display 140. For example, FIG. 4 illustrates a captured image frame 400 provided on display 140 in accordance with an embodiment of the disclosure. As shown, image frame 400 includes various features of scene 170 including a gas 172 and scene features 174, 176, and 178.

In this case, gas 172, feature 174, feature 176, and feature 178 all exhibit different intensities in the wavelengths captured by imager 130. As a result, the pixels of captured image frame 400 corresponding to these features will exhibit different pixel values. For example, feature 178 may exhibit the lowest pixel values due to relatively low intensity and/or high absorption in the imaged wavelengths. Gas 172 may exhibit low-to-intermediate pixel values due to absorption by gas 172 in the imaged wavelengths. Scene feature 174 may exhibit intermediate-to-high pixel values due to a higher intensity and/or less absorption in the imaged wavelengths. Scene feature 176 may exhibit relatively high pixel values due to an even higher intensity and/or even less absorption in the imaged wavelengths.

Figure 5:
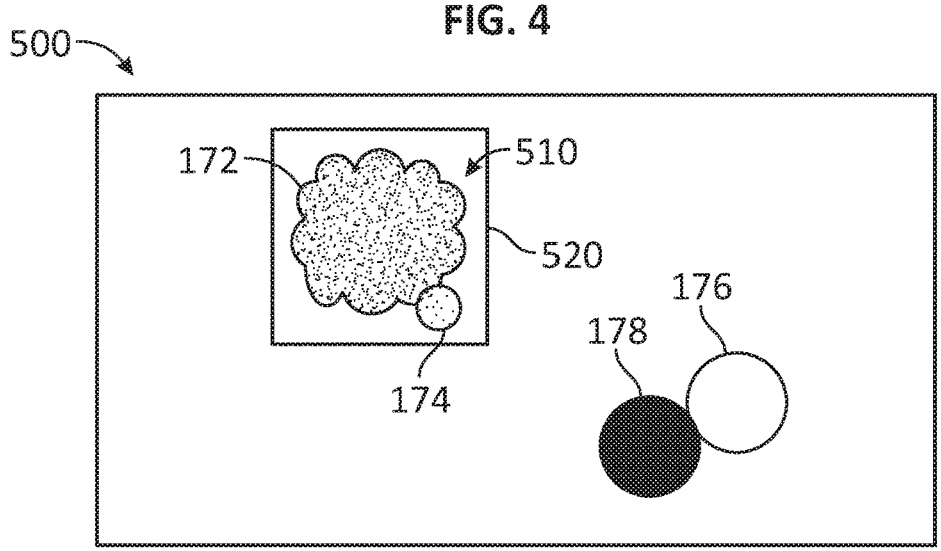
FIG. 5 illustrates a captured image frame with a selected subset in accordance with an embodiment of the disclosure.
Figure 6:
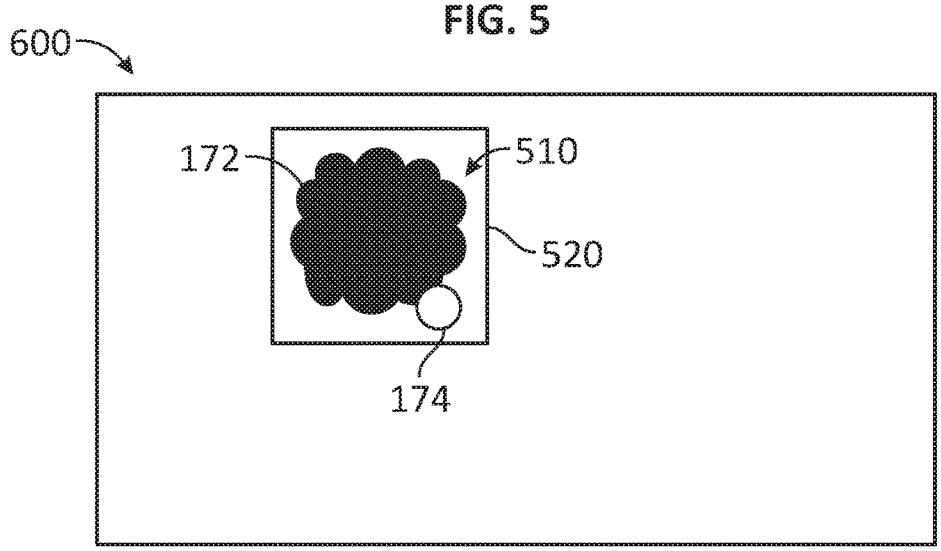
FIG. 6 illustrates a captured image frame displayed with a determined level and span in accordance with an embodiment of the disclosure.

However, when image frame 400 is displayed in block 312, it may be displayed in accordance with a level and span selected from the entire range of pixel values (e.g., a first range) associated with the entire image frame 400. For example, in this case, the entire range of pixel values associated with gas 172 and all of features 174, 176, and 178 is mapped to corresponding grayscale values displayed to the user (e.g., although grayscale values are shown in FIGS. 4-6 for ease of illustration, false color values may be displayed in some embodiments). In this regard, the level may be selected, for example, as the median pixel value of the entire image frame 400, while the span may include the entire range of pixel values present in image frame 400.

As a result, feature 178 may be mapped to a very dark grayscale value or false color value due to its low intensity, while feature 176 may be mapped to a very bright grayscale value or false color value due to its high intensity. However, gas 172 and feature 174 may be mapped to grayscale values or false color values that are very close to each other because their intermediate pixel values fall between the extremes of features 176 and 178. As a result, it is difficult to clearly discern any significant contrast between gas 172 and feature 174.

As a result, selections of level and span that utilize all pixel values of image frame 400 can make it difficult for a user to perceive sufficient contrast between pixel values in the intermediate range, such as those associated with gas 172 and feature 174. This is apparent in FIG. 4 where gas 172 and feature 174 appear very similar with very little contrast (e.g., they may appear to be part of the same gas plume or other feature), while features 176 and 178 are more easily distinguishable.

Also, in FIGS. 4, 5, and 6, the remainder of scene 170 (e.g., the background separate from gas 174 and features 172, 176, and 178) is omitted for clarity and ease of illustration in image frames 400 and 600. As a result, in cases where the remainder of scene 170 is included, the remaining portions of image frames 400 and 600 may appear dark (e.g., mapped to grayscale values or false color values corresponding to cold temperatures) when the remainder of scene 170 is colder than gas 172 and/or features 172, 176, and/or 178. Other brightness levels (e.g., mapped to grayscale values or false color values corresponding to other temperatures) may be used as appropriate in various embodiments.

In block 314, a subset of image frame 400 is selected. In some embodiments, this may be performed by the user of system 100. In some embodiments, the user may interact with user controls 150 to identify a perimeter to enclose the selected subset. In some embodiments, the user may interact with a touchscreen (e.g., provided by display 140) to draw the perimeter around the subset. In some embodiments, the subset and perimeter may be selected by logic device 110 (e.g., based on image processing performed on image frame 400 by logic device 110). In block 316, logic device 110 displays the perimeter corresponding to the selected subset on display 140.

FIG. 5 illustrates image frame 400 displayed with a perimeter 520 corresponding to a selected subset 510 in accordance with an embodiment of the disclosure. As shown, perimeter 520 encloses gas 172 and feature 174, but does not enclose features 176 and 178. Thus, it will be appreciated that subset 510 includes intermediate pixel values associated with gas 172 and feature 174, but does not include the high pixel values associated with feature 176 or the low pixel values associated with feature 178.

Although perimeter 520 is illustrated as rectangle, any desired shape may be used. For example, in some embodiments, a user may draw perimeter 520 on a touchscreen provided by display 140 in any desired manner to enclose gas feature 172.

In block 318, logic device 110 analyzes the pixel values included in the pixels of subset 510. For example, logic device 110 may determine all of the pixel values contained in subset 510 and the number of pixels in subset 510 associated with each of the pixel values.

Figure 7:
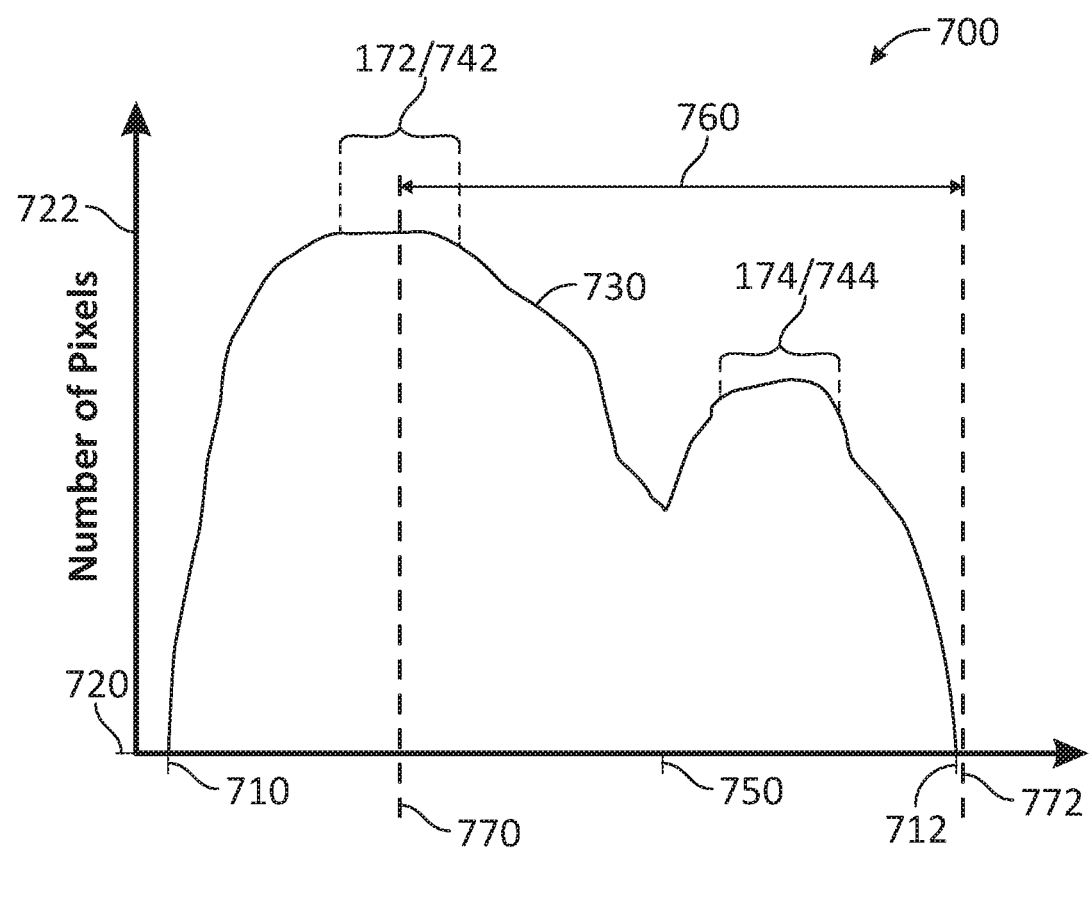
FIG. 7 illustrates a histogram in accordance with an embodiment of the disclosure.

In block 320, logic device 110 generates a histogram using the pixel values and the numbers of pixels determined in block 318. For example, FIG. 7 illustrates a histogram 700 generated for subset 510 of image frame 400 in accordance with an embodiment of the disclosure.

As shown, histogram 700 exhibits a curve 730 corresponding to the number of pixels of subset 510 associated with various pixel values ranging from a minimum pixel value 710 to a maximum pixel value 712. Because histogram 700 is prepared from subset 510 of image frame 400, pixel values of feature 176 (e.g., higher than maximum pixel value 712) and pixel values of feature 178 (e.g., lower than minimum pixel value 710) are not shown. As also shown, the number of pixels associated with each pixel value ranges from a minimum number 720 (e.g., zero) to a maximum number 722.

In block 322, logic device 110 determines a median pixel value of subset 510. In block 324, logic device 110 determines the level that may be used as a reference pixel value (e.g., a center or midpoint of the span) to be used for displaying image frame 400 in a scaled manner to improve gas contrast. For example, in some embodiments, block 324 may include assigning the median pixel value (determined in block 322) to the level. In FIG. 7, level 750 is identified. In this embodiment, level 750 corresponds to the median pixel value wherein equal numbers of pixels in subset 510 exhibit pixel values greater than and less than level 750. In other embodiments, level 750 may be selected using other processing of histogram 700 and/or image frame 400. Accordingly, in some embodiments, the median pixel value determination of block 322 may be omitted.

In block 326, logic device 110 determines a gas peak and a feature peak of histogram 700. As shown in FIG. 5, subset 510 includes two primary features, namely gas 172 and feature 174. Accordingly, in some embodiments, the pixels having the largest numbers of pixel values in subset 510 may be associated with gas 172 and feature 174 (e.g., where perimeter 520 is provided in close proximity to gas 172 and/or feature 174).

As shown in FIG. 7, curve 730 exhibits two prominent peaks 742 and 744 corresponding to the pixel values that occur most frequently in subset 510. In some embodiments discussed further herein, peaks 742 and 744 may correspond to gas 172 (e.g., associated with lower pixel values) and feature 174 (e.g., associated with higher pixel values), respectively. However, in other embodiments, the gas 172 may be associated with higher pixel values and feature 174 may be associated with lower pixel values (e.g., the positions of peaks 742 and 744 may change relative to each other).

Also, in some embodiments where perimeter 520 is provided in close proximity to gas 172 and/or where gas 172 comprises a majority of subset 510, then gas 172 may be associated with the largest peak 742 in histogram 700. However, in other embodiments, where perimeter 520 is not provided in close proximity to gas 172 and/or where feature 174 comprises a majority of subset 510, then feature 174 may be associated with the largest peak 742 in histogram 700.

Logic device 110 may use various techniques to detect peaks 742 and 744 including, for example, detecting local maximums along curve 730 and/or other processing as appropriate.

In block 328, logic device 110 determines a span corresponding to the range of pixel values (e.g., a second range) to be used for displaying a scaled adjusted image frame 400. For example, the span may include a range of pixel values greater than and less than the level determined in block 324.

In some embodiments, logic device 110 may determine the span using the peaks 742 and 744 determined in block 326. In some embodiments, the span may be selected to include level 750 and at least a portion of each of peaks 742 and 744. For example, in FIG. 7, a span 760 is identified. As shown, span 760 includes level 750 (e.g., the median pixel value), extends down to a lower limit 770 including at least a portion of peak 742, and extends up to an upper limit 772 including at least a portion of peak 744. Accordingly, the overall range of pixel values displayed for image frame 400 when using span 760 will extend from pixel values associated with gas 172 to pixel values associated with feature 174.

In FIG. 7, span 760 extends from lower limit 770 at a local maximum of peak 742 to upper limit 772 beyond peak 744. However, other lower and upper limits may be selected for span 760. For example, in some embodiments, span 760 may encompass both of peaks 742 and 744. In some embodiments, span 760 may extend between local maximums of both peaks 742 and 744. In some embodiments, span 760 may be centered on level 750 and extend symmetrically to higher and lower pixel values such that level 750 defines the midpoint of span 760. In some embodiments, span 760 may extend asymmetrically having a greater range above or below level 750.

In block 330, logic device 110 scales image frame 400 using the level 750 and span 760 determined in blocks 324 and 328, respectively, to provide an adjusted image frame 600 (e.g., also referred to as a scaled image frame). In block 332, logic device 110 displays adjusted image frame 600 on display 140. For example, FIG. 6 illustrates adjusted image frame 600 displayed using level 750 and span 760 in accordance with an embodiment of the disclosure.

As discussed with regard to FIG. 7, the lower limit 770 of span 760 includes peak 742 which corresponds to gas 172. As a result, when adjusted image frame 600 is displayed, gas 172 will be mapped to a very dark grayscale value or false color value (e.g., similar to the manner that feature 178 was displayed in FIG. 5 using full image scaling). As a result, gas 172 may appear saturated in adjusted image frame 600 and thus may be readily discernable by a user.

As also discussed with regard to FIG. 7, the upper limit 772 of span 760 extends slightly beyond peak 744 which corresponds to feature 174. As a result, when scaled image frame 600 is displayed, feature 174 will be mapped to a very bright grayscale value or false color value (e.g., similar to the manner that feature 176 was displayed in FIG. 5 using full image scaling).

Thus, as shown in FIG. 6, gas 172 and feature 174 will exhibit much greater contrast relative to each other in image frame 600 (e.g., encompassing only pixel values within span 760) in comparison to original image frame 400 (e.g., encompassing all pixel values). In addition, because the pixel values of features 176 and 178 fall outside the range of pixel values defined by span 760, features 176 and 178 are removed (e.g., omitted) and not displayed in FIG. 6.

In block 334, logic device 110 performs further processing on image frame 400 and/or adjusted image frame 600 as may be desired in particular implementations. For example, in some embodiments, perimeter 520 may be removed and subset 510 may be zoomed to substantially fill display 140.

In some embodiments, only a single peak may detected. For example, if only scene feature 174 is present in subset 510, then only a single peak 744 may be provided in histogram 700. In this case, level 750 and/or span 760 may be selected such that if gas 172 later enters subset 510, gas 172 can still be displayed with high contrast (e.g., displayed in a saturated or semi-saturated manner). For example, in the case of a cold gas 172 and a hot background or scene feature 174, level 750 and/or span 760 may be selected such that the lower limit 770 of span 760 occurs at or below a minimum (e.g., lowest) pixel value associated with the pixels of subset 510. As a result, if gas 172 later enters subset 510, it can be expected to be within span 760 near the lower limit 770 and thus displayed with high contrast.

In some embodiments, the upper limit 772 of span 760 may be selected higher than the maximum pixel value associated with the pixels of background or scene feature 174 to prevent them from appearing completely white (e.g., where a white grayscale value is associated with upper limit 772).

In some embodiments, level 750 and/or span 760 may be selected dynamically as the pixel value content of subset 510 changes (e.g., as additional image frames are captured and processed). For example, level 750 may shift and span 760 may widen as gas 172 enters subset 510, and level 750 may shift and span 760 may narrow as gas 172 leaves subset 510.

Although the determination of level 750 and span 760 have been discussed with regard to subset 510, the various principles discussed herein may be applied to the entirety of images frame 400 and 600 as appropriate.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
   receiving a captured image frame comprising a plurality of pixels having a first range of associated pixel values;
   receiving a selection of a subset of the pixels, wherein the subset comprises a gas feature and a scene feature;
   determining a span associated with the pixels of the subset having a second range of associated pixel values smaller than the first range;
   scaling the captured image frame to provide an adjusted image frame limited to the second range of pixel values associated with the span to increase contrast between the gas feature and the scene feature; and
   displaying the adjusted image frame.

2. The method of claim 1, further comprising determining a level corresponding to a reference pixel value within the second range.

3. The method of claim 2, wherein the level is a median pixel value of the subset.

4. The method of claim 2, wherein the level defines a midpoint of the span.

5. The method of claim 1, further comprising:
   displaying the captured image frame using the first range of pixel values to a user; and
   wherein the selection of the subset is received from a user in response to the displaying of the captured image frame.

6. The method of claim 5, wherein the receiving the selection comprises receiving the user's selection defining a perimeter of the subset on a touchscreen displaying the captured image frame.

7. The method of claim 1, wherein the captured image frame comprises an additional scene feature having pixel values outside the second range, wherein the adjusted image frame omits the additional scene feature.

8. The method of claim 1, further comprising:
   generating a histogram of the pixel values of the subset; and
   determining the span using the histogram.

9. The method of claim 8, further comprising:
   identifying a first peak of the histogram associated with the gas feature;
   identifying a second peak of the histogram associated with the scene feature;
   wherein the span is determined using the first and second peaks; and
   wherein the second range of pixel values associated with the span extends at least from the first peak to the second peak.

10. A system comprising:
    an imager configured to capture image frames;
    a display; and
    a logic device configured to:
    receive a captured image frame comprising a plurality of pixels having a first range of associated pixel values,
    receive a selection of a subset of the pixels, wherein the subset comprises a gas feature and a scene feature,
    determine a span associated with the pixels of the subset having a second range of associated pixel values smaller than the first range,
    scale the captured image frame to provide an adjusted image frame limited to the second range of pixel values associated with the span to increase contrast between the gas feature and the scene feature, and
    provide the adjusted image frame to the display.

11. The system of claim 10, wherein the logic device is configured to determine a level corresponding to a reference pixel value within the second range, wherein the system is a gas detection camera.

12. The system of claim 11, wherein the level is a median pixel value of the subset.

13. The system of claim 12, wherein the level defines a midpoint of the span.

14. The system of claim 10, wherein the logic device is configured to:
    provide the captured image frame to the display using the first range of pixel values to be viewed a user; and
    wherein the selection of the subset is received from the user.

15. The system of claim 14, wherein the display is a touchscreen, wherein the selection is a selection by the user defining a perimeter of the subset on the touchscreen.

16. The system of claim 10, wherein the captured image frame comprises an additional scene feature having pixel values outside the second range, wherein the adjusted image frame omits the additional scene feature.

17. The system of claim 10, wherein the logic device is configured to:

generate a histogram of the pixel values of the subset; and
determine the span using the histogram.

18. The system of claim 17, wherein the logic device is configured to:
  identify a first peak of the histogram associated with the gas feature;
  identify a second peak of the histogram associated with the scene feature;
  wherein the span is determined using the first and second peaks; and
  wherein the second range of pixel values associated with the span extends at least from the first peak to the second peak.

19. A method comprising:
  receiving a first captured image frame comprising a plurality of pixels having a first range of associated pixel values;
  receiving a selection of a subset of the pixels, wherein the subset comprises a scene feature;
  determining a span associated with the pixels of the subset having a second range of associated pixel values smaller than the first range;
  wherein the span comprises a first limit associated with the scene feature and a second limit associated with an expected gas feature;
  receiving a second captured image frame comprising the scene feature and the gas feature; and
  scaling the second captured image frame to provide an adjusted image frame limited to the second range of pixel values associated with the span to increase contrast between the gas feature and the scene feature.

20. The method of claim 19, further comprising adjusting the span in response to pixel values associated with the second captured image frame.

* * * * *